2 1 -143 *
SEARCH
C. A. PAQUELIN,
Assignor to W. VAN B. PHILLIPS.
CARBURETING APPARATUS.
No. 10,358. Reissued July 17, 1883.
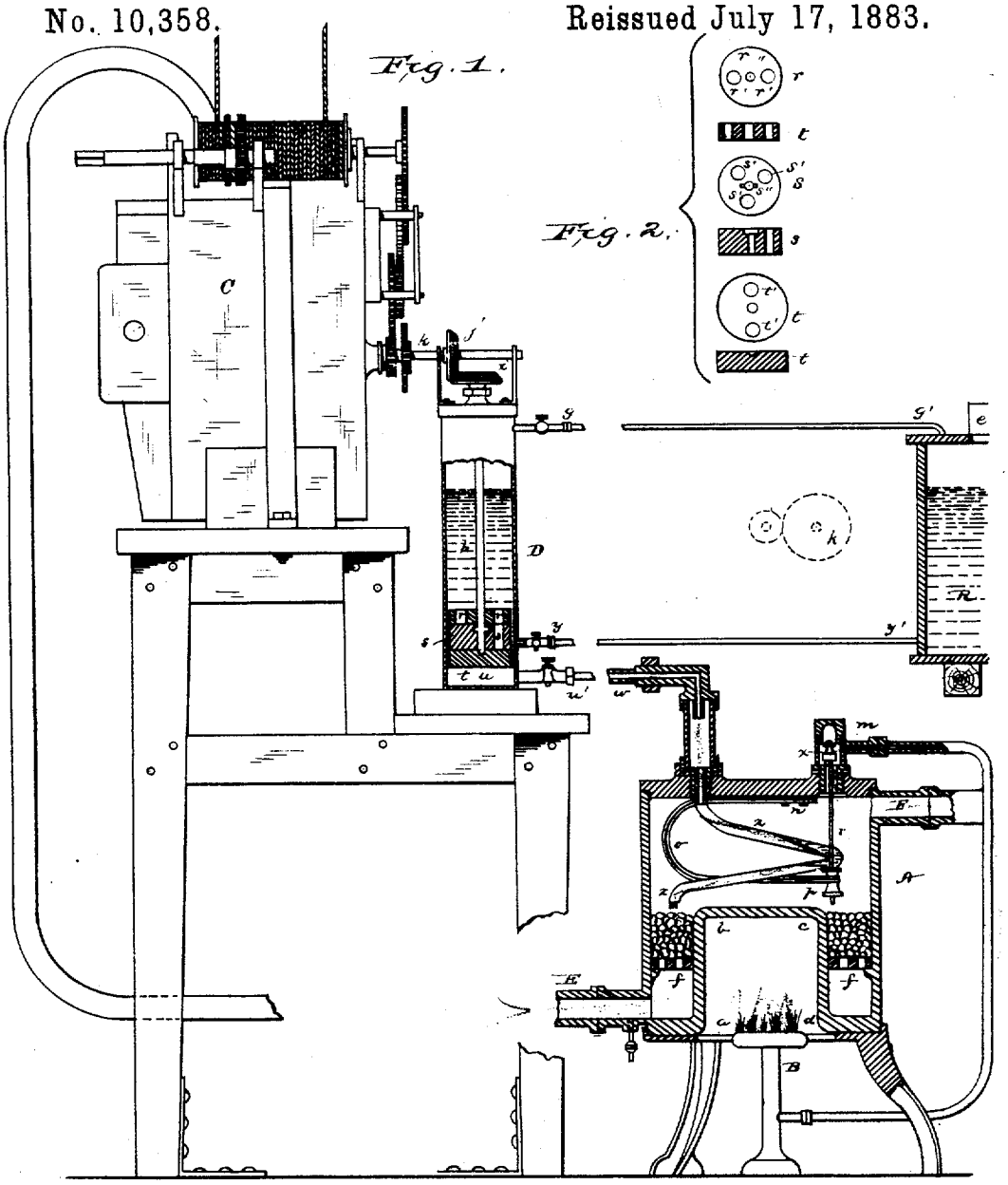
Witnesses.
Edwin L. Yerree.
J. J. McCarthy.
Inventor.
Claude André Paquelin
By Whipple Van Buren Phillips
his attorney.
Washington, D. C.

UNITED STATES PATENT OFFICE.

CLAUDE ANDRÉ PAQUELIN, OF PARIS, FRANCE, ASSIGNOR TO WHIPPLE VAN B. PHILLIPS, OF PROVIDENCE, RHODE ISLAND.

CARBURETING APPARATUS.

SPECIFICATION forming part of Reissued Letters Patent No. 10,358, dated July 17, 1883.

Original No. 206,402, dated July 30, 1878. Application for reissue filed February 21, 1882. Patented in France November 22, 1877.

*To all whom it may concern:*

Be it known that I, CLAUDE ANDRÉ PAQUELIN, of Paris, France, have invented Improvements in Apparatus for Carbureting Air or Gas; and I do hereby declare that the following is a full, clear, and exact description of the same, reference being had to the annexed drawings, making part of the same.

This invention relates to an improved apparatus for carbureting gas and air or charging the same with the vapor of liquid hydrocarbons, and is applicable for lighting or heating purposes, or both.

The invention has for its objects to provide an improved apparatus whereby the quantity of liquid hydrocarbon supplied to the gas or air may be automatically regulated by the volume of such gas or air being carbureted, and the gas or air uniformly carbureted.

The apparatus comprises, first, a reservoir of liquid hydrocarbon; second, an apparatus for circulating the air or gas, (this may be a meter driven by clock-work or weights, a weighted gas-holder, a mechanical injector, or other means of forcing the air or gas;) third, an apparatus for distributing the liquid hydrocarbon; fourth, a carburetor for mixing the hydrocarbon with the air or gas; fifth, a burner for heating the carburetor.

The characteristic features of this combined apparatus are the peculiar air or gas circulating apparatus and the hydrocarbon-distributer, which are interdependent, so that the air or gas and the hydrocarbon are always supplied to the carburetor in constant proportions, which may, however, be varied at will, so as to yield a constant product. The carburetor is maintained at a constant temperature by means of a peculiar form of regulator, termed an "expansion-regulator," whose office is to so regulate the flame of a burner supplied from the carburetor itself as to render the volatilization of every particle of the liquid hydrocarbon complete, so as to enable comparatively heavy oils, which are plentiful and cheap, to be used, if necessary.

In order that the invention may be more readily understood, I will proceed to describe it with reference to the annexed drawings, which represent one example of the invention.

Figure 1 is a part sectional elevation of the apparatus complete. Fig. 2 represents certain details of the hydrocarbon-distributer.

A is the carbureting-chamber, constructed of a cast-iron cylinder closed at the top by a cover. The bottom is cast with a dome or heating-chamber of cylindrical form rising up into the carburetor, as shown, and heated by a burner, B, described hereinafter. The upper part of the annular space between the sides of the carburetor and the heating-chamber *a b c d* is filled with broken glass or other suitable material, resting on a grating, *f*, upon which the hydrocarbon, supplied as hereinafter described, is caused to trickle.

The air or gas, supplied by a suitable forcing apparatus and by the meter C, enters the mixing-chamber by the pipe E beneath the grating *f*, and circulates through or between the fragments of glass upon said grating, which are kept wetted with hydrocarbon, as above mentioned. The air thus becomes carbureted, and, rising through the mixing-chamber, passes out at pipe F, to be consumed after traversing some wire-gauze. The air or gas is supplied, as in other carburetors, either by a gas-holder (filled by a hand-pump) to meter C, or by an exhauster operated by clock-work, counterweights, or otherwise. The shaft of the meter-drum traverses the side of the casing C, and is geared, as shown, with the shaft of the apparatus D, which supplies the liquid hydrocarbon to the carburetor.

Change-wheels may be employed to vary the proportions of air or gas and hydrocarbon. This distributer consists of a sheet-iron cylinder supplied with hydrocarbon from a reservoir, R, which may be situated outside the room.

Communication is established by pipes *g g'* and *y y'*, respectively, between the upper and lower parts of the distributer and the reservoir R. R is filled at an aperture, *e*, closed by a stopper. A gage-glass may be affixed to the reservoir to show the height of the liquid therein, and the reservoir can be refilled when required without interrupting the working of the apparatus.

At the lower part of the distributer are three disks, *r s t*, Fig. 2, whose surfaces are made perfectly true. The lowest disk, *t*, is ordered in the distributer near and above the bottom, and is provided with one or two ports or passages, $t'$, through which the hydrocarbon can flow into the space $u$ beneath, whence it flows through cock $u'$ and pipe $w$ to the carburetor A.

$h$ is a central vertical spindle stepped in a central cavity in disk $t$, and passing up through the distributer D and through a shifting box on the cover thereof. The spindle $h$ is geared by bevel-wheels $i$ $j$ with the horizontal shaft K, which, as before mentioned, is geared with the axis of the meter-drum, so that when the latter turns the spindle $h$ turns also.

The disk $s$ has one or more ports or passages $s'$, and also a central hole, $s^2$, through which the spindle $h$, on which the disk $s$ is keyed, passes. The disk $s$ rests and turns upon disk $t$, and its ports $s'$ successively come opposite the ports $t'$.

A third disk, $r$, having a central hole, $r''$, by which it is slipped on the spindle $h$, and two ports or passages, $r'$, does not turn with the spindle $h$, but is fixed in such a position that its ports $r'$ are in a vertical plane at right angles to the plane of the ports $t'$. Thus arranged, when the meter-drum is rotated by the passage of the air or gas, the spindle $h$ and disk $s$ turn also, and the ports $s'$ are alternately filled with hydrocarbon as they pass under ports $r'$ and emptied as they pass over ports $t'$.

The quantity of liquid hydrocarbon which is thus intermittently supplied to $u$, and thence to the carburetor, is thus proportional to the number of revolutions of the meter-drum, or, in other words, to the volume of air or gas which it supplies to the carburetor, so that by suitably proportioning the gearing and the size of the ports $s'$ the quantity of hydrocarbon to a given volume of air or gas may be regulated as required.

The tube $w$, which conveys the hydrocarbon from the distributer to the carburetor, communicates with a serpentine gutter, $z$, whence the liquid hydrocarbon drips onto the broken glass or other material on the grating $f$.

In order to maintain a constant temperature in the carburetor, a small chamber, $m$, is fixed in the cover of the carburetor and communicates with the interior thereof. Access is had to the chamber $m$ at the top, which is closed by a screw-plug.

A U-shaped regulator, $n$ $o$ $p$, made of two metals—iron and copper—is fixed by one end to the inside of the cover of the carburetor, and is connected at the other end to the stem $v$ of a valve, $x$, contained in chamber $m$. The valve $x$ is screwed on the rod $v$, so that it can be readily adjusted nearer to or farther from its seat.

The operation is as follows: When the temperature rises the U-shaped regulator expands and the valve $x$ is drawn down toward its seat. By leading a tube from chamber $m$, above the valve-seat, to the burner B, the latter may be supplied with carbureted air from the carburetor. The flame of the burner heats the carburetor, and as the temperature rises the valve $x$ is gradually closed and the supply to the burner reduced, so that by suitably adjusting the regulator and valve any desired temperature may be constantly maintained.

B may be a Bunsen lamp, and the lower air-inlet thereof may be regulated or closed beforehand. The burner proper is a ring-shaped copper tube pierced with holes, at which the carbureted air is burned; or any other suitable burner may be used. With such an arrangement the carburetor may be raised to 60° or 100° centigrade without inconvenience, so that much heavier hydrocarbons than have necessarily been used hitherto may be employed, a very good light being obtainable by using hydrocarbons marking 680° or even 780°, which abound in commerce.

I claim—

1. In a carbureting apparatus, the combination of a gas or air measuring or circulating apparatus and a hydrocarbon-distributer, which are interdependent, with the connecting-gearing and change mechanism, whereby the gas or air and the hydrocarbon are supplied to the carburetor in constant proportions and the proportions varied at will.

2. In combination with a carburetor, the interdependent air or gas circulating apparatus and hydrocarbon-distributer and connecting mechanism, by which gas or air and the liquid hydrocarbon are supplied to the carburetor in constant proportions varied at will.

3. In a carbureting apparatus, the meter-drum rotated by the passing air or gas, in combination with the intermittent liquid-hydrocarbon supply or distributing apparatus, operating mechanism connecting the two, by which they are made interdependent and the quantity of liquid is proportioned to the volume of air or gas supplied by the meter to the carburetor.

4. In a carbureting apparatus, the combination of the distributer D with the hydrocarbon-reservoir R and connecting-pipes and chamber A, the distributer being provided with the revolving shaft $h$ and two or more perforated disks, $s$ $t$ $r$, substantially as specified.

5. In a carbureting apparatus, the carburetor A, provided with the chamber $m$ and pipe and burner connected therewith, valve $x$, stem $v$, and U-shaped regulator $n$ $o$ $p$, substantially as specified.

CLAUDE ANDRÉ PAQUELIN.

Witnesses:
CH. G. THIRION.
GEO. WALKER.